(12) United States Patent
Rodriguez et al.

(10) Patent No.: US 11,098,204 B2
(45) Date of Patent: Aug. 24, 2021

(54) WATER-BORNE PRECURSORS FOR FORMING HETEROPHASIC ANTI-FOULING, POLYMERIC COATINGS HAVING A FLUORINATED CONTINUOUS PHASE WITH NON-FLUORINATED DOMAINS

(71) Applicant: GM GLOBAL TECHNOLOGY OPERATIONS LLC, Detroit, MI (US)

(72) Inventors: April R. Rodriguez, Santa Monica, CA (US); Adam F. Gross, Santa Monica, CA (US); Ashley M. Dustin, Los Angeles, CA (US); Anthony L. Smith, Troy, MI (US); Andrew P. Nowak, Los Angeles, CA (US); Kevin J. Drummey, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/746,090

(22) Filed: Jan. 17, 2020

(65) Prior Publication Data
US 2020/0148896 A1    May 14, 2020

Related U.S. Application Data

(62) Division of application No. 16/155,347, filed on Oct. 9, 2018, now Pat. No. 10,570,292.

(51) Int. Cl.
*C09D 5/16* (2006.01)
*C08F 214/22* (2006.01)
*C09D 127/22* (2006.01)

(52) U.S. Cl.
CPC .......... *C09D 5/1668* (2013.01); *C08F 214/22* (2013.01); *C09D 127/22* (2013.01); *C08F 2810/20* (2013.01)

(58) Field of Classification Search
CPC ... C09D 5/1668; C09D 272/22; C08F 214/22; C08F 2810/20
(Continued)

(56) References Cited

U.S. PATENT DOCUMENTS 3,272,890 A    9/1966  O'Leary, Jr. et al.
3,358,052 A    12/1967 Archer, Jr. et al.
(Continued)

FOREIGN PATENT DOCUMENTS

CN    1742064 A     3/2006
CN    108602983 A   9/2018
(Continued)

OTHER PUBLICATIONS

Rodriguez, April R. et al., U.S. Appl. No. 16/155,341, filed Oct. 9, 2018 entitled "Heterophasic Anti-Fouling, Solvent-Borne Polymeric Coating Having a Fluorinated Continuous Phase With Non-Fluorinated Domains," 55 pages.
(Continued)

*Primary Examiner* — Michael Bernshteyn
(74) *Attorney, Agent, or Firm* — Harness, Dickey & Pierce, P.L.C.

(57) ABSTRACT

An aqueous or water-borne precursor for forming an anti-fouling heterophasic thermoset polymeric coating is provided. The precursor includes a fluorine-containing polyol precursor having a functionality greater than about 2 that forms a branched fluorine-containing polymer component defining a continuous phase in the anti-fouling heterophasic thermoset polymeric coating. The precursor also includes a fluorine-free precursor that forms a fluorine-free component present as a plurality of domains each having an average size of greater than or equal about 100 nm to less than or equal about 5,000 nm defining a discrete phase within the continuous phase in the anti-fouling heterophasic thermoset
(Continued)

polymeric coating. A crosslinking agent and water are also present. An emulsifier may also be included. Methods of making anti-fouling heterophasic thermoset polymeric coatings with such precursors are also provided.

18 Claims, 3 Drawing Sheets

(58) Field of Classification Search
USPC .......................................................... 524/545
See application file for complete search history.

(56) References Cited

U.S. PATENT DOCUMENTS

| | | | |
|---|---|---|---|
| 4,179,479 A | 12/1979 | Carter, Jr. | |
| 4,376,654 A | 3/1983 | Zola | |
| 4,581,412 A | 4/1986 | Ohmori et al. | |
| 4,667,000 A | 5/1987 | Ohmor et al. | |
| 4,855,164 A | 8/1989 | Burkholder et al. | |
| 5,028,648 A | 7/1991 | Famili et al. | |
| 5,055,525 A | 10/1991 | Henton et al. | |
| 5,371,143 A | 12/1994 | Novak et al. | |
| 5,536,539 A | 7/1996 | Ellison et al. | |
| 5,549,948 A | 8/1996 | Blong et al. | |
| 5,898,046 A | 4/1999 | Raiford et al. | |
| 5,919,851 A | 7/1999 | Yamaguchi et al. | |
| 6,005,031 A | 12/1999 | Bremer-Masseus et al. | |
| 6,071,564 A * | 6/2000 | Marchetti | C08G 18/089 427/385.5 |
| 6,127,486 A | 10/2000 | Burger et al. | |
| 6,576,706 B1 | 6/2003 | Nodera et al. | |
| 6,740,357 B2 | 5/2004 | Yamaguchi et al. | |
| 6,992,132 B2 | 1/2006 | Trombetta et al. | |
| 7,361,708 B2 * | 4/2008 | Tomihashi | C08F 259/08 510/356 |
| 7,557,154 B2 | 7/2009 | Agarwal et al. | |
| 7,807,752 B2 * | 10/2010 | Masutani | C08G 65/007 525/104 |
| 8,710,142 B2 | 4/2014 | Chida et al. | |
| 10,125,227 B2 | 11/2018 | Gross et al. | |
| 10,240,065 B2 * | 3/2019 | Nowak | C08G 18/0823 |
| 10,259,971 B2 | 4/2019 | Nowak et al. | |
| 10,344,244 B2 | 7/2019 | Gross et al. | |
| 10,400,136 B2 | 9/2019 | Dustin et al. | |
| 10,442,935 B2 | 10/2019 | Nelson et al. | |
| 10,619,057 B2 * | 4/2020 | Nowak | C08G 18/4833 |
| 10,689,542 B2 * | 6/2020 | Dustin | C08G 18/5015 |
| 2002/0013385 A1 | 1/2002 | Simendinger | |
| 2003/0027927 A1 | 2/2003 | White et al. | |
| 2006/0142455 A1 | 6/2006 | Agarwal et al. | |
| 2010/0063197 A1 | 3/2010 | Collier et al. | |
| 2016/0009971 A1 | 1/2016 | Wang et al. | |
| 2016/0194574 A1 | 7/2016 | Gross et al. | |
| 2016/0201005 A1 | 7/2016 | Nowak et al. | |
| 2016/0254141 A1 | 9/2016 | Hustad et al. | |
| 2017/0009000 A1 | 1/2017 | Hendershot et al. | |
| 2017/0015848 A1 | 1/2017 | Aruga | |
| 2017/0015922 A1 | 1/2017 | Gross et al. | |
| 2017/0174910 A1* | 6/2017 | Nowak | C08G 18/242 |
| 2017/0174911 A1* | 6/2017 | Nowak | C08G 18/758 |
| 2017/0267871 A1* | 9/2017 | Nowak | C09D 5/1681 |
| 2017/0298286 A1* | 10/2017 | Nowak | C10M 103/04 |
| 2018/0030329 A1 | 2/2018 | Nowak et al. | |
| 2018/0037746 A1* | 2/2018 | Nelson | C09D 5/00 |
| 2018/0104182 A1 | 4/2018 | Kiser et al. | |
| 2018/0208795 A1* | 7/2018 | Dustin | C08G 18/6692 |
| 2019/0048223 A1* | 2/2019 | Dustin | C09D 171/02 |
| 2019/0125028 A1 | 5/2019 | Bartel et al. | |
| 2019/0142317 A1 | 5/2019 | Steedman et al. | |
| 2019/0302316 A1 | 10/2019 | Gross et al. | |
| 2019/0382578 A1 | 12/2019 | Rodriguez et al. | |
| 2020/0109294 A1 | 4/2020 | Rodriguez et al. | |
| 2020/0123409 A1 | 4/2020 | Shigeno | |

FOREIGN PATENT DOCUMENTS

| | | |
|---|---|---|
| CN | 110191932 A | 8/2019 |
| CN | 110615982 A | 12/2019 |
| CN | 110799619 A | 2/2020 |
| CN | 111019450 A | 4/2020 |
| CN | 111019498 A | 4/2020 |
| CN | 111032802 A | 4/2020 |
| DE | 102019114612 A1 | 12/2019 |
| DE | 102019115261 A1 | 4/2020 |
| DE | 102019115461 A1 | 4/2020 |
| JP | 2014072434 A | 4/2014 |
| WO | 2016118464 A2 | 7/2016 |
| WO | 2017117157 A1 | 7/2017 |
| WO | 2018140212 A1 | 8/2018 |
| WO | 2019005272 A1 | 1/2019 |

OTHER PUBLICATIONS

Akhmatskaya, E. et al, "Dynamic modeling of the morpholoy of multiphase waterborne polymer particles" Colloid and Polymer Science 2013, 291 (1), 87-98.

Althues, H. et al., "Functional inorganic nanofillers for transparent polymers," Chem. Soc. Rev. (2007) 36, pp. 1454-1465; (Published Apr. 17, 2007) DOI: 10.1039/b608177k.

Chevalier, Y. et al., "Structure of Waterborne Organic Composite Coatings" Macromolecules 1999, 32 (23), 7887-7896.

Del Amo, B. et al., "High performance water-based paints with non-toxic anticorrosive pigments" Progress in Organic Coatings 2002, 45 (4), 389-397.

Goikoetxea, M. et al, "Polymerization Kinetics and Microstructure of Waterborne Acrylic/Alkyd Nanocomposites Synthesized by Miniemulsion" Journal of Polymer Science Part A: Polymer Chemistry 2009, 47 (19), 4871-4885.

Gross, Adam F. et al., "Construction of an Insect Impact Testing System and Data from Low Adhesion Polymer Coatings" 2016 Adhesion Society Annual Meeting Proceedings, Feb. 22, 2016; 3 pages.

Gross, Adam F. et al., "Insect Abatement on Lubricious, Low Adhesion Polymer Coatings Measured with an Insect Impact Testing System." Adv Polym Sci. (Dec. 2017). 17 pages. DOI: 10.1007/12_2017_35.

Kawahara, H. et al., "Preparation of Epoxy Resin/Acrylic Composite Latexes by Miniemulsion Polymerization Method" Journal of Applied Polymer Science 2001, 81 (1), 128-133.

Overbeek, A., "Polymer heterogeneity in waterborne coatings," J. Coat. Technol. Res, 7 (1) (2010), pp. 1-21; DOI: 101007/s11998-009-9201-5.

Stubbs, J. M. et al., "Core-shell and other multiphase latex particles-confirming their morphologies and relating those to synthesis variables," J. Coat. Technol. Res., 5 (2) (2008), pp. 169-180; DOI: 10.1007/a11998-007-9060-x.

Tielemans, M. et al., "Multiphase coatings from complex radiation curable polyurethane dispersions" Progress in Organic Coatings 2012, 75 (4), 560-568.

"Anti-icing Coated Ultrasonic Sensors"; Research Disclosure™, Database No. 641070, Aug. 16, 2017, 2 pages.

Evo® Protect ESA. Technical Datasheet. Dystar L.P., 2015, 2 pages.

Fluoro coating, weather resistant coating (Varnish): Zeffle™ GK Series. Datasheet, Ver. 03 [online]. Daikin Industries LTD., Nov. 2013 [retrieved on Sep. 11, 2018]. Retrieved from the Internet: <URL: https://www.daikin.com/chm/products/pdfDown.php?url=pdf/tds/tds_gk-1_j_Ver03_E.pdf>.

First Office Action for Chinese Patent Application No. 201910499934.7 dated Feb. 3, 2021 with correspondence dated Feb. 7, 2021 from China Patent Agent (H.K.) Ltd summarizing content, 14 pages.

First Office Action for Chinese Patent Application No. 201910504011.6 dated Feb. 25, 2021 with correspondence dated Mar. 1, 2021 from China Patent Agent (H.K.) Ltd summarizing content, 11 pages.

\* cited by examiner

WATER-BORNE PRECURSORS FOR FORMING HETEROPHASIC ANTI-FOULING, POLYMERIC COATINGS HAVING A FLUORINATED CONTINUOUS PHASE WITH NON-FLUORINATED DOMAINS

CROSS-REFERENCE TO RELATED APPLICATIONS

This application is a divisional of U.S. patent application Ser. No. 16/155,347 filed on Oct. 9, 2018, now U.S. Pat. No. 10,570,292. The entire disclosure of the above application is incorporated herein by reference.

INTRODUCTION

This section provides background information related to the present disclosure which is not necessarily prior art.

The present disclosure relates generally to a heterophasic thermoset polymeric coating derived from a water-borne solution and more specifically to a water-borne precursor that can be used to treat an article to form the heterophasic thermoset polymer coating that includes a continuous phase having a fluorine-containing polymer component and a discrete phase comprising a fluorine-free polymer component, where the discrete phase is present as a plurality of domains in the continuous phase.

Surfaces of various materials, such as plastics, metals, sensors, fabrics, leather, and glass, can become soiled from debris (e.g., particles, oils, dust, insects), especially in automotive applications. The debris can affect not only aesthetics of surfaces, but also performance where the surfaces are functional. For example, if the material is a plastic or metal component present on the exterior of an automobile, the presence of debris can affect the airflow over the surface. Further, performance of surfaces of sensors can be detrimentally impacted by the presence of debris or foreign objects. Thus, it is desirable to formulate self-cleaning, anti-fouling or "debris-phobic" coatings or surfaces that can remove the debris by, for example, controlling chemical interactions between the debris and the surface.

Various debris-phobic and self-cleaning surfaces include, for example, superhydrophobic and superoleophobic surfaces, fluoropolymer sheets or treated surfaces, fluorofluid filled surfaces, and enzyme filled coatings, by way of example. Superhydrophobic and superoleophobic surfaces can create high contact angles (e.g., greater than 150°) via a nanostructure between the surface and water and oil drops, respectively, resulting in the drops rolling off the surface rather than remaining on the surface. However, these surfaces do not repel solid foreign matter or contaminant vapors, which can remain on the surface and render it ineffective. Furthermore, over time, the extreme wettability of these surfaces can fade due to environmental exposure or damage, for example, these surfaces can lose functionality (e.g., these surfaces can also lose function if the nanostructured top surface is scratched).

Low surface energy polymers, such as those containing low surface energy perfluoropolyethers and perfluoroalkyl groups, have been explored for low adhesion and solvent repellent applications. While these low-surface energy polymers can facilitate release of materials adhering to them in both water and air, they do not necessarily provide a lubricated surface to promote clearing of foreign matter. While fluoropolymer sheets or treated surfaces have low surface energies and thus low adhesion force between foreign matter and the surface, removal of all soils from the surface is thus problematic.

Fluoro-fluid filled surfaces, such as slippery liquid-infused porous surfaces (SLIPS) can have low adhesion between external debris and the surface, but if any of the fluid is lost, the surface cannot be refilled or renewed once applied on the surface. Another technique involves enzyme-filled coatings, which can leach out enzymes that help degrade and dissolve debris on the surface, but the enzymes can be quickly depleted and cannot be refilled. Furthermore, certain debris-phobic and self-cleaning surfaces may be relatively fragile. Thus, there remains a need for robust self-cleaning, anti-fouling surface coatings, which can both prevent and reduce adhesion of debris, including solids and fluids. Moreover, it would be desirable to have precursors for making such anti-fouling surface coatings that have reduced volatile organic compounds, including reduced amounts of non-aqueous solvents.

SUMMARY

This section provides a general summary of the disclosure, and is not a comprehensive disclosure of its full scope or all of its features.

In various aspects, the present disclosure provides an aqueous precursor for forming an anti-fouling heterophasic thermoset polymeric coating. The aqueous precursor includes a fluorine-containing precursor having a functionality greater than about 2 that forms a fluorine-containing polymer component defining a continuous phase in the anti-fouling heterophasic thermoset polymeric coating. The aqueous precursor also includes a fluorine-free precursor that forms a fluorine-free component present as a plurality of domains each having an average size of greater than or equal to about 100 nm to less than or equal to about 5,000 nm. The plurality of domains define a discrete phase within the continuous phase in the anti-fouling heterophasic thermoset polymeric coating. The aqueous precursor also includes a crosslinking agent including a moiety selected from the group consisting of an amine moiety, a hydroxyl moiety, an isocyanate moiety, and a combination thereof. The crosslinking agent is capable of bonding at least a portion of the fluorine-containing component in the continuous phase with at least a portion of the fluorine-free component in the discrete phase. The aqueous precursor also includes water.

In one aspect, (i) the fluorine-containing polymer component includes a fluoropolymer selected from the group consisting of a polyvinylidene fluoride copolymer, a polyfluoroacrylate, a polytetrafluoroethylene copolymer, a fluorinated polyol, a perfluorocarbon, a perfluoropolyether, a polyfluorosiloxane, a polyvinylidene fluoride, a polytrifluoroethylene, and a combination thereof. The (ii) the fluorine-free component is selected from the group consisting of a hygroscopic polymer, a hydrophobic polymer that is not lipophobic, an ionic hydrophilic precursor, an amphiphilic polymer, and a combination thereof. In certain aspect, the (a) hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. In certain other aspects, the (b) hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. In yet other aspects, the (c) ionic hydrophilic precursor including a pendant carboxylate group, an amine group, a sulfate group, a phosphate group, and a combination thereof. In further aspects, the (d) amphiphilic polymer is selected from the group consisting of poloxamers, a polyethylene-block-poly(ethylene glycol) polymer, poly (ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof.

In one aspect, the fluorine-containing precursor includes a polyol fluoroacrylate or a polyol copolymer of polyvinylidene difluoride.

In one aspect, the aqueous precursor further includes at least one agent selected from the group consisting of an emulsifier, a catalyst, an anti-oxidant, a hindered amine stabilizer, a particulate filler, a pigment, a dye, a plasticizer, a flame retardant, a flattening agent, an adhesion promotor, and a combination thereof.

In one aspect, the fluorine-containing polymer component has an average molecular weight of greater than or equal to 10,000 g/mol to less than or equal to about 50,000 g/mol and the fluorine-free component has an average molecular weight of about 100 g/mol to about 15,000 g/mol.

In one aspect, the fluorine-containing precursor is a branched fluorine-containing polyol precursor that forms a branched fluorine-containing polymer component.

The present disclosure also contemplates a method of treating an article including (a) applying an aqueous precursor liquid to a surface of the article. The aqueous precursor liquid includes: a fluorine-containing polyol precursor having a functionality greater than about 2; a fluorine-free precursor; a crosslinking agent including a moiety selected from the group consisting of an amine moiety, a hydroxyl moiety, an isocyanate moiety, and a combination thereof; and water. The method also includes (b) solidifying the aqueous precursor liquid to form an anti-fouling thermoset polymeric coating on the surface of the article. The anti-fouling thermoset polymeric coating includes a continuous phase including a fluorine-containing polymer formed from the fluorine-containing polyol precursor and a discrete phase defining a plurality of domains including a fluorine-free polymer. The fluorine-free component is substantially immiscible with the fluorine-containing polymer, each domain of the plurality of domains has an average size of greater than or equal to about 100 nm to less than or equal to about 5,000 nm within the continuous phase. At least a portion of the fluorine-containing polymer in the continuous phase and at least a portion of the fluorine-free component in the discrete phase are bonded together with a moiety selected from the group consisting of a nitrogen-containing moiety, an oxygen-containing moiety, an isocyanate-containing moiety, and a combination thereof.

In one aspect, (i) the continuous phase includes a fluoropolymer selected from the group consisting of a polyfluoroacrylate, a polyvinylidene fluoride copolymer, a polytetrafluoroethylene copolymer, a perfluoropolyether, a polyfluorosiloxane, a polytrifluoroethylene, and a combination thereof. The (ii) fluorine-free component is selected from the group consisting of a hygroscopic polymer, a hydrophobic polymer that is not lipophobic, an ionic hydrophilic precursor, an amphiphilic polymer, and a combination thereof.

In one aspect, (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. In another aspect, (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. In a further aspect, (c) the ionic hydrophilic precursor including a pendant carboxylate group, an amine group, a sulfate group, a phosphate group, and a combination thereof. In yet a further aspect, (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof.

In one aspect, (i) the fluorine-containing polymer has an average molecular weight of greater than or equal to 10,000 g/mol to less than or equal to about 50,000 g/mol and (ii) the fluorine-free component has an average molecular weight of greater than or equal to about 100 g/mol to less than or equal to about 15,000 g/mol.

In one aspect, the fluorine-containing polyol precursor is a branched fluorine-containing polyol precursor that forms a branched fluorine-containing polymer component.

In one aspect, the fluorine-containing polyol precursor includes a polyol fluoroacrylate or a polyol copolymer of polyvinylidene difluoride.

In one aspect, (i) the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked isocyanates, carbodiimide crosslinkers, and a combination thereof. The (ii) precursor liquid optionally includes a catalyst selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

In one aspect, the surface of the article includes a material selected from the group consisting of glass, plastic, fabric, textile, leather, surface, paint, and a combination thereof.

In one aspect, the method further includes preparing the precursor liquid by: (i) mixing the fluorine-containing polyol precursor, wherein the fluorine-containing polyol precursor is water-borne, with the fluorine-free precursor, water, the crosslinking agent, and an optional catalyst; (ii) emulsifying a water-borne fluorine-containing polyol precursor with water and an emulsifier component to form the aqueous precursor including the fluorine-containing polyol precursor and mixing the aqueous precursor with the fluorine-free precursor, water, the crosslinking agent, and an optional catalyst; or (iii) reacting the fluorine-containing polyol precursor, wherein the fluorine-containing polyol precursor is water-borne, with a hydrophilic moiety, an ionic moiety, or a combination thereof to form a fluoropolymer and mixing the fluoropolymer, with the fluorine-free precursor, water, the crosslinking agent, and an optional catalyst.

The present disclosure also provides a heterophasic thermoset polymeric coating including a continuous phase including a fluorine-containing polymer component formed from at least one fluorine-containing polyol precursor having a functionality of greater than 2. The heterophasic thermoset polymeric coating also includes a discrete phase defining a plurality of domains including a fluorine-free component formed from a fluorine-free precursor, wherein the fluorine-free component is substantially immiscible with the fluorine-containing polymer component. Each domain of the plurality of domains has an average size of greater than or equal to about 100 nm to less than or equal to about 5,000 nm within the continuous phase. At least a portion of the fluorine-free component in the discrete phase is bonded together with a moiety selected from the group consisting of a nitrogen-containing moiety, an oxygen-containing moiety, an isocyanate-containing moiety, and a combination thereof. The heterophasic thermoset polymeric coating is formed from an aqueous precursor including water, the fluorine-containing polyol precursor, and the fluorine-free precursor.

In one aspect, the fluorine-containing polyol precursor includes a polyol fluoroacrylate or a polyol copolymer of polyvinylidene difluoride.

In one aspect, the heterophasic thermoset polymeric coating has an average light absorbency of about 5% to about 35% over a wavelength range of about 400 nm to about 800 nm.

In one aspect, the fluorine-containing polymer component has an average molecular weight of greater than or equal to 10,000 g/mol to less than or equal to about 50,000 g/mol.

In one aspect, (i) the fluorine-containing polymer component includes a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof. The (ii) fluorine-free component is selected from the group consisting of a hygroscopic polymer, a hydrophobic polymer that is not lipophobic, an ionic hydrophilic precursor, an amphiphilic polymer, and a combination thereof. In one further aspect, (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. In another aspect, (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. In yet another aspect, (c) the ionic hydrophilic precursor including a pendant carboxylate group, an amine group, a sulfate group, a phosphate group, and a combination thereof. In a further aspect, (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
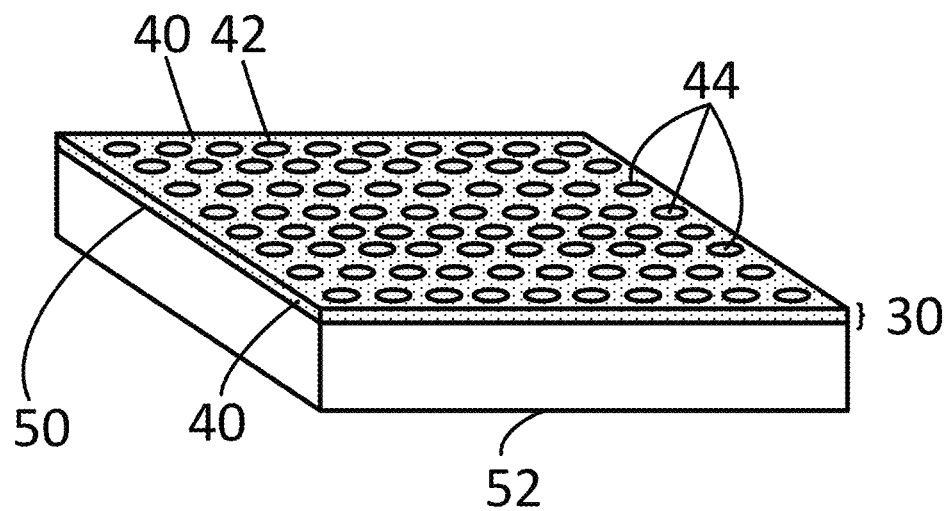
FIG. 1 is a schematic illustrating an example of a surface of an article coated with a heterophasic thermoset polymeric coating prepared according to various aspects of the present disclosure that demonstrates low friction, anti-fouling, self-cleaning, and energy absorption properties.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

In various aspects, as shown in FIG. 1, the present disclosure pertains to a heterophasic thermoset polymeric coating 30 that has a continuous phase 40 and a discrete or discontinuous phase 42 and serves as an anti-fouling coating to minimize adhesion of foreign matter, such as debris, soiling, and the like. The discrete phase defines a plurality of domains 44 of relatively small size distributed within the continuous phase 40. For example, in certain variations, such domains 44 have an average size of greater than or equal to about 100 nm to less than or equal to about 5,000 nm. It should be noted that FIG. 1 is merely an illustrative simplified schematic and is not to scale, as the plurality of domains are in fact much smaller than those shown and may be distributed not only at the surface, but within/throughout the bulk of the continuous phase 40. In certain aspects, the plurality of domains 44 is substantially evenly or homogeneously distributed within the continuous phase 40. The continuous phase 40 includes a fluorine-containing polymer component, while the discrete phase 42 includes a fluorine-free component, which may be a fluorine-free polymer component. The fluorine-containing polymer component is substantially immiscible with the fluorine-containing polymer component. Further, at least a portion of the fluorine-free polymer component in the discrete phase 42 is bonded together with a moiety selected from the group consisting of a nitrogen-containing moiety, an oxygen-containing moiety, an isocyanate-containing moiety, and a combination thereof. The heterophasic thermoset polymeric coating 30 is disposed on a surface 50 of an article 52 and thus provides anti-fouling properties to the article 52.

The present technology thus provides an anti-fouling coating having discrete, separated areas of fluorinated material and non-fluorinated material exposed on the surface. The fluorinated material is a low surface energy material that inhibits wetting and adhesion while the second, immiscible chemistry breaks up the contact line of the foreign matter, such as soil, along the surface. Low surface energy materials are understood to have a surface tension or energy of less than or equal to about 35 mN/m. Fluorinated low surface energy materials can include "polyfluoroethers," or polymers that contain an ether group having an oxygen atom bonded to two alkyl or aryl groups, where at least one hydrogen atom is replaced in the alkyl or aryl group by a fluorine atom. "Perfluoropolyethers" (PFPE) are a subset of polyfluoroethers that generally refers to a linear polyfluoroether having all hydrogen atoms in the alkyl or aryl groups being replaced by fluorine atoms.

Previous thermoplastic anti-fouling coatings generally have used expensive perfluoropolyethers (PFPE), which are linear polymers with oxygen linkages in the backbone. These types of anti-fouling coatings thus serve to break adhesion of foreign matter, such as debris and soils, on the surface as compared to a fluorinated material coating alone or a coating having inclusions of larger sizes and/or of uneven distribution.

While earlier anti-fouling coatings having a continuous matrix with a plurality of low surface energy inclusions have been formed, these coatings may potentially suffer from certain drawbacks. Such earlier coatings were thermoplastics that are less robust than thermoset coatings and further have relatively large domains of inclusions within a low surface energy polymeric matrix. In contrast, the present technology provides an anti-fouling coating having a substantially even distribution of a plurality of relatively small domains of a non-fluorinated material, which is more desirable to minimize adhesion of any debris with the coating. The thermoset anti-fouling coatings prepared in accordance with various aspects of the present disclosure can necessarily provide a lubricated surface to promote clearing of foreign matter. Moreover, in accordance with various aspects of the present disclosure, the anti-fouling coatings prepared in accordance with the present teachings are environmentally friendly and made with a water-borne precursor liquid that comprises water and thus minimizes and/or avoids use of volatile organic compounds/non-aqueous solvents.

In certain aspects, an anti-fouling coating creates a continuous phase from a multifunctional fluorine-containing precursor, such as a multifunctional fluorine-containing polyol. The fluorine-containing precursor has a functionality of greater than two (2). By a functionality of greater than 2, it is meant that each single precursor molecule has an average of greater than 2 functional groups, such as a hydroxyl group or other functional groups (for example, having an average of 3 or 4 hydroxyl groups per molecule) that react to form a cross-linked fluorine-containing polymer network. The functional groups may be distributed along the backbone of a fluoropolymer, rather than only being present on a terminal end of an oligomer or polymer chain. In certain variations, such a precursor unit may have an average hydroxyl value of less than or equal to about 20 mg KOH/resin g (equivalent weight (EW)=200 g/mol). In certain variations, the fluorine-containing precursor is a branched molecule and when incorporated into the fluorine-containing polymer network provides a branched polymer.

As will be discussed in greater detail below, a multifunctional fluorine-containing precursor having a functionality of greater than 2, such as a fluorine-containing polyol precursor, reacts to form a cross-linked fluorine-containing polymer network that defines a continuous phase in the heterophasic thermosetting anti-fouling polymeric coatings. In certain aspects, the branched fluorine-containing polymer network has a relatively high crosslink density. Such a heterophasic thermosetting anti-fouling polymeric coating has not only an improved durability, but an enhanced ability to repel foreign matter from the coated surface.

Notably, it is difficult to control the size of phase-separated domains when using a multifunctional fluorinated polyol as precursors for a coating, because they bond to other polymer chains along their backbone due to the presence of functional groups therein, instead of bonding only at the terminal end of each chain. In certain aspects, terminal end bonding can promote the chain coiling into a domain size controlled by length of the precursor, such as PFPE precursor. Thus, the high degree of functionality along the backbone of the fluorinated-based polymer increases disorder in the polymer network, making it hard to predict phase separation and difficult to control the size and distribution of the domains. Further, it is difficult to control uniformity in forming phase-separated domains when the precursors are water-borne, due to potential instabilities in the precursor system when it is water-borne and contains water, as compared to a solvent-borne precursor that contains non-aqueous solvents.

However, in accordance with the present disclosure, a coating is provided that contains two chemically distinct microphase separated materials, which enables both materials to be provided along an exposed surface and thus in contact with a foreign agent on the surface, while the chemically distinct nature of the two chemistries inhibits adhesion of the foreign agent (e.g., soils) to the surface. The present disclosure contemplates a combination of nonmiscible chemical functions and controlled phase separation when using a branched fluorinated polyol with a functionality of greater than 2 that can produce a highly crosslinked network due to the high level of hydroxyl groups found throughout the backbone of the fluorinated polymer. Moreover, such a controlled heterophasic coating is capable of being formed via a precursor that is water-based and contains water. In certain aspects, as described further herein, the anti-fouling heterophasic thermoset polymeric coating can be formed on a substrate and delivered as an environmentally friendly water-borne formulation.

In various aspects, the present disclosure provides a heterophasic thermoset polymeric coating that includes a continuous phase comprising a fluorine-containing polymer network formed at least in part from a multifunctional fluorine-containing precursor having a functionality of greater than 2. A fluorine-containing precursor may have greater than two functional groups represented by —XH, were X=O or NH. In certain aspects, the fluorine-containing polymer network is branched and/or cross-linked. In certain variations, a continuous phase comprises a branched fluorine-containing polymer component/network is formed at least in part from a fluorine-containing polyol precursor having a functionality of greater than 2, meaning that the precursor comprises one or more carbon-fluorine bonds and more than two hydroxyl groups (where X=O).

In certain aspects, the fluorine-containing polyol precursor is functionalized with more than two hydroxyl groups per unit (e.g., a monomer). The fluorine-containing precursor is advantageously soluble or dispersible in water. The fluorine-containing polyol precursor also comprises fluorine and carbon units. In certain aspects, the monomer may comprise polyvinylidene fluoride/polyvinylidene difluoride (PVDF). In one variation, the fluorine-containing polyol precursor may comprise a polyvinylidene difluoride copolymer. In one aspect, the fluorine-containing polyol precursor may have an average hydroxyl value of less than or equal to about 25 mg KOH/resin g (equivalent weight (EW) =approximately 179 g/mol). By way of example, a suitable water-borne fluorine-containing PVDF polyol precursor is ZEFFLE S-7560™ from Daikin. In certain variations, the fluorine-containing polyol precursor may comprise a fluoroacrylate monomer. One suitable acrylate-based fluorine-containing polyol precursor is a C6 based non-ionic fluorocarbon commercially available as EVOPROTECT™ ESA from DyStar.

In certain aspects, the multifunctional fluorine-containing polymer is formed from a monomer comprising PVDF or fluoroacrylate, where the polymer has an average molecular weight, such as weight average molecular weight ($M_w$) of greater than or equal to 2,000 g/mol to less than or equal to about 50,000 g/mol and in certain variations, optionally of greater than or equal to 10,000 g/mol to less than or equal to about 50,000 g/mol. Such molecular weight can be measured by GPC or NMR (end-group analysis), as appreciated by those of skill in the art. As discussed further below, the fluorine-containing polyol precursor is reacted to form a branched fluorine-containing polymer component/network, which defines a continuous phase in the present anti-fouling thermoplastic polymeric coatings.

In certain other alternative aspects, the fluorine-containing precursor with a functionality of greater than about 2 may include other monomers aside from fluoroacrylates and/or vinylidene fluoride, including by way of example, precursors selected from the group consisting of: tetrafluoroethylene, perfluoroethers, fluorosiloxane, trifluoroethylene, vinyl fluoride, hexafluoropropylene, perflluoropropylvinylether, perfluoromethylvinylether, and a combination thereof.

The branched fluorine-containing polymer component/network in the coating may include a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof. In certain aspects, the branched fluorine-containing polymer component may be formed in part from the fluorine-containing polyol as well as another distinct precursor/monomer, like those listed above. The branched fluorine-containing polymer component/network may be present in the heterophasic coating in an amount of greater than or equal to about 20% to less than or equal to about 95% by weight of the total heterophasic coating.

The heterophasic thermoset polymeric coating also includes a discrete phase that includes a fluorine-free component. The fluorine-free component is substantially immiscible with the fluorine-containing polymer component. A miscible material, such as a miscible polymeric material, is one that is capable of being intermixed with another distinct material on the molecular scale, while a substantially immiscible material cannot be intermixed or distributed into another distinct material, but instead forms distinct phases or layers from the main material, without additional manipulation or reaction within the matrix.

An immiscible fluorine-free component optionally comprises a fluorine-free polymer. In certain aspects, the fluorine-free polymer may be a poly(alkene glycol) selected from the group consisting of: poly(ethylene glycol), poly(propylene glycol), poly(tetramethylene glycol), and a combination thereof. In certain variations, the fluorine-free polymer is selected from the group consisting of a hygroscopic polymer, a hydrophobic polymer, an ionic hydrophilic precursor or polymer, an amphiphilic precursor or polymer, and a combination thereof.

In certain aspects, the hygroscopic polymer is selected from the group consisting of poly(acrylic acid), poly(alkylene glycols), such as polyethylene glycol, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof.

In other aspects, the hydrophobic polymer, which optionally may not be lipophobic, is selected from the group consisting of a polyalkylene glycol, such as poly(propylene glycol), poly(tetramethylene glycol), a polybutadiene, a polycarbonate, a polycaprolactone, a polyacrylic polyol, and a combination thereof. In certain variations, an amphiphilic polymer is a block polymer.

In one aspect, the fluorine-free component may include an amphiphilic polymer selected from the group of block polymers including polyalkylene glycols, such as polyethylene-block-poly(propylene glycol) polymers. These amphiphilic polymers may include poloxamers, which are non-ionic triblock copolymers, where a central hydrophobic moiety, like poly(propylene oxide), is flanked by hydrophilic moieties, like poly(ethylene oxide). Poloxamers include PLURONICS' triblock polymers. In certain variations, the amphiphilic polymer may be a triblock copolymer comprising poly(ethylene glycol)/poly(ethylene oxide)(PEG/PEO) and poly(propylene oxide) (PPO/PPG) (commercially available as PLURONIC™ P123, 70% PPG). In other aspects, the amphiphilic polymer may be selected from polyethylene-block-poly(ethylene glycol) polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, copolymers, equivalents, and combinations thereof.

In yet other aspects, the fluorine-free component may be a hydrophilic polymer or precursor with ionic charge that comprises monomers with an ionic charge, for example, comprising a pendant carboxylate group, an amine group, a sulfate group, a phosphate group, and a combination thereof. Such charged monomers may be inserted along the polymer backbone.

In certain variations, a fluorine-free monomer, such as 2,2-bis(hydroxymethyl)propionic acid (DMPA) having a carboxylic acid group, is mixed with the fluorine-containing that becomes part of the crosslinked polymer coating and thus defines a fluorine-free component, which defines a plurality of domains. The plurality of domains define a discrete phase within the fluorine-containing polymer.

In certain aspects, the fluorine-free component is present in the coating in an amount of greater than or equal to about 5% to less than or equal to about 90% by weight of the total heterophasic coating, optionally greater than or equal to about 20% to less than or equal to about 90%, optionally greater than or equal to about 20% to less than or equal to about 50%. The fluorine-free component may have an average molecular weight (e.g., $M_w$) of greater than or equal to about 100 g/mol to less than or equal to about 15,000 g/mol and optionally the fluorine-free component has an average molecular weight of greater than or equal to about 100 g/mol to less than or equal to about 4,000 g/mol.

The fluorine-free component forms a plurality of domains within the continuous phase (defined by the branched fluorine-containing polymer network) that are stable and evenly distributed. The plurality of domains define a discrete phase in the continuous phase. Furthermore, each domain of the plurality of domains has an average size of greater than or equal to about 100 nm to less than or equal to about 5,000 nm within the continuous phase. By an average size of a domain, it is meant that at least one dimension of the discrete domain within the continuous matrix, such as a diameter if the domain forms a round shape or alternatively, a length or width, is in the range of ≥100 nm and ≤5,000 nm and in certain aspects, optionally ≥500 nm and ≤5,000 nm. In certain aspects, all of the dimensions of the domain may be within the range of ≥100 nm and ≤5,000 nm. In certain other aspects, the plurality of domains of the discrete phase is substantially evenly or homogeneously distributed throughout the continuous phase, meaning that the domains are relatively evenly distributed within the continuous phase, while accounting for slight deviations in distances between respective domains. The substantially even distribution of the domains ensures the ability of the coating to provide superior long-term anti-fouling and self-cleaning properties.

At least a portion of the fluorine-free component in the discrete phase is bonded together with a moiety selected from the group consisting of a nitrogen-containing moiety, an oxygen-containing moiety, an isocyanate-containing moiety, and a combination thereof. Thus, the precursor of the heterophasic thermoset polymeric coating may include a crosslinking agent including a moiety selected from the group consisting of an amine moiety, a hydroxyl moiety, an isocyanate moiety, and a combination thereof. In certain aspects, the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked crosslinkers, such as blocked isocyanates, carbodiimide crosslinkers, and a combination thereof. In certain aspects, the crosslinking agent promotes reaction between a portion of the fluorine-free component in the discrete phase and the branched fluorine-containing polymer component in the continuous phase. Therefore, in such embodiments, at least a portion of the fluorine-containing polymer component in the continuous phase and at least a portion of the fluorine-free component in the discrete phase are bonded together with a moiety selected from the group consisting of a nitrogen-containing moiety, an oxygen-containing moiety, an isocyanate-containing moiety, and a combination thereof.

In one variation, the anti-fouling heterophasic thermoplastic polymeric coating comprises a branched fluorine-containing polymer component formed from a polyol copolymer of tetrafluoroethylene, a fluorine-free component comprising a polyalkylene glycol, such as polyethylene glycol and/or polypropylene glycol, and an isocyanate-containing moiety.

In another variation, the anti-fouling heterophasic thermoplastic polymeric coating comprises a branched fluorine-containing polymer component formed from a polyol copolymer of tetrafluoroethylene, a fluorine-free component comprising a siloxane, and an isocyanate-containing moiety.

In yet another variation, the anti-fouling heterophasic thermoplastic polymeric coating comprises a branched fluorine-containing polymer component formed from a polyol copolymer of tetrafluoroethylene, a fluorine-free component formed from an acrylic polyol, and an isocyanate-containing moiety.

In one variation, the anti-fouling heterophasic thermoplastic polymeric coating comprises a branched fluorine-containing polymer component formed from a polyol copolymer of tetrafluoroethylene, a fluorine-free component formed from an acrylic polyol and a polyalkylene glycol, such as polyethylene glycol and/or polypropylene glycol, and an isocyanate-containing moiety.

The anti-fouling thermoset heterophasic coating may further include at least one further agent or additive selected from the group consisting of an anti-oxidant, a hindered amine stabilizer, a particulate filler, a pigment, a dye, a plasticizer, a flame retardant, a flattening agent, an adhesion promotor, and a combination thereof. Each agent may be present at less than or equal to about 5% by weight of the coating, optionally less than or equal to about 4% by weight of the coating, optionally less than or equal to about 3% by weight of the coating, optionally less than or equal to about 1% by weight of the coating, optionally less than or equal to about 1% by weight of the coating, and in certain aspects, optionally less than or equal to about 0.5% by weight of the coating. In certain aspects, the one or more agents are cumulatively present at less than or equal to about 10% by weight of the coating, optionally less than or equal to about 7% by weight of the coating, optionally less than or equal to about 5% by weight of the coating, optionally less than or equal to about 3% by weight of the coating, optionally less than or equal to about 2% by weight of the coating, and in certain aspects, optionally less than or equal to about 1% by weight of the coating.

The addition of stabilizers directly to polymers can help prevent oxidation, polymer chain scissions and crosslinking reactions caused by exposure to ultraviolet (UV) radiation or high temperatures. Anti-oxidants can be added to minimize or terminate oxidation caused by UV or heat. Hindered amines stabilizers can help minimize or prevent light-induced degradation of the polymer. Additionally, aryl (e.g., phenyl) groups may be added in the polymer chain or at the chain ends to increase thermal stability of the polymer.

The particulate fillers may be selected from, but not limited to, the group consisting of silica, alumina, silicates, talc, aluminosilicates, barium sulfate, mica, diatomite, calcium carbonate, calcium sulfate, carbon, wollastonite, and a combination thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Such additives may be incorporated into the heterophasic thermoset polymeric coating to alter the appearance of the coating. By way of example, colloidal silica may be added to a polymer coating at greater than or equal to about 0.5 weight % to less than or equal to about 5 weight % to reduce gloss.

In other aspects, the anti-fouling heterophasic thermoplastic polymeric coating may further include yet another third polymer as a block, which may be capable of physiabsorbing onto specific surfaces. For example, such a third polymer block may be a polyurethane that hydrogen bonds with polyester and nylon surfaces.

In certain aspects, the present disclosure contemplates forming a water-borne liquid precursor of the heterophasic thermoset polymeric coating. The liquid precursor may include a fluorine-containing precursor having a functionality greater than about 2 that forms a fluorine-containing polymer component defining a continuous phase in the anti-fouling heterophasic thermoset polymeric coating, such as any of the examples described above. The fluorine-containing polymer component may be a branched fluorine-containing polymer component formed from a multifunctional branched fluorine-containing polyol precursor. The liquid precursor may also include a fluorine-free precursor that forms a fluorine-free component present as a plurality of domains, which as noted above, may each have an average size of greater than or equal to about 100 nm to less than or equal to about 5,000 nm. The domains define a discrete phase within the continuous phase in the anti-fouling heterophasic thermoset polymeric coating. The fluorine-free precursor may form a fluorine-free such as any of the examples described above. A crosslinking agent comprising a moiety selected from the group consisting of an amine moiety, a hydroxyl moiety, an isocyanate moiety, and a combination thereof may be included in the liquid precursor. The crosslinking agent may be any of those described above and is capable of bonding at least a portion of the fluorine-containing polymer component in the continuous phase with at least a portion of the fluorine-free component in the discrete phase.

The water-borne liquid precursor may be an aqueous precursor that includes water and optionally an aqueous solvent, such as polar solvents like methanol, ethanol, propanol, butanol, acetone, and the like. Notably, the term solvent more broadly encompasses carriers rather, than strictly solvating compounds capable of dissolving and forming a solution with all components in the precursor. To become water-borne, the various components may be emulsified in water, optionally using one or more surfactants, or chemically modified with ionic groups and/or hydrophilic groups to aid in emulsification and stabilization.

To form a water-borne formulation, the fluoropolymer component and optionally other components may be selected to be water-borne components or may be altered to be compatible with an aqueous system. For example, a solvent-borne precursor can be emulsified in water with surfactants. The solvent-borne precursor is mixed with the one or more surfactants of choice and stirred rapidly while adding water dropwise until the amount of solvent is less than or equal to 10 wt. %. The solution is continuously stirred with or without gentle (for example, approximately 30° C.) heating until a dispersion is obtained.

Alternatively, a solvent borne precursor is optionally chemically bonded to the second fluorine-free chemistry that enables water dispersibility, such as ionic and/or hydrophilic groups. Some examples include 2,2-bis(hydroxymethyl)propionic acid (DMPA), triethylene glycol, and polyethylene glycol.

Hence, in certain aspects, the aqueous precursor may also include non-aqueous solvents, which may be present as carriers for one or more of the starting materials, by way of non-limiting example. When present, a non-aqueous solvent is selected from the group consisting of n-butyl acetate, methyl ethyl ketone, acetone, methyl isobutyl ketone, methyl isopropyl ketone, methyl sec-butyl ketone xylene, tetrahydrofuran, cyclohexane, 2-butyoxyethanol acetate, toluene, and a combination thereof. In certain aspects, water is present at greater than or equal to about 50% to less than or equal to about 80% by weight of the aqueous precursor. In certain aspects, the various precursors may be combined and the resin may be diluted with water, so that the resin is present at greater than or equal to about 1% to less than or equal to about 50% by weight of the water-borne liquid precursor.

In certain variations, the water-borne or aqueous precursor may comprise an emulsifier, such as a surfactant. Suitable surfactants include, but are not limited to, ionic surfactants, like sodium dodecyl sulfate (SDS), non-ionic surfactants, such as sorbitan esters (SPAN™), and polyethoxylated sorbitan esters (TWEEN™), and a combination thereof. The emulsifier(s) are present at greater than or equal to about 0.05% to less than or equal to about 5% by weight of the liquid precursor.

In certain other aspects, the liquid precursor may optionally include a catalyst to promote reaction of the precursors. The catalyst may be selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

The liquid precursor may also include at least one further agent selected from the group consisting of an anti-oxidant, a hindered amine stabilizer, a particulate filler, a pigment, a dye, a plasticizer, a flame retardant, a flattening agent, an adhesion promotor, and a combination thereof, such as any of those described above.

The present technology is relevant to surface modification of various components susceptible to soiling, especially those in automotive and other vehicle applications, by way of non-limiting example. For example, various automobile interior and exterior surfaces may be coated with the anti-fouling self-cleaning heterophasic thermoplastic polymeric coatings of the present teachings to have increased stain resistance and cleanability. The coatings may be applied to a variety of surfaces, including a surface of a material selected from the group consisting of fabric or textile, plastic, leather, glass, paint (e.g., a painted surface), metal, and a combination thereof.

Although automotive applications are generally discussed, the anti-fouling heterophasic thermoplastic polymeric coating may also be used in other applications such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like.

In certain variations, a method of treating an article is provided by the present disclosure. The article may include a wheel, a steering wheel, a lens, a sensor, such as LIDAR sensor or ultrasonic back-up sensor, glass (such as a window, a windshield, and the like), a plastic (such as hard plastics, like polycarbonate), a fabric, a leather surface, a painted surface, a window, a metal panel, and equivalents and combinations thereof.

The method may include (a) applying a water-borne or aqueous precursor liquid to a surface of the article. The aqueous precursor liquid or solution may be an emulsion. The precursor includes a fluorine-containing precursor having a functionality greater than about 2 that forms a fluorine-containing polymer including those described above. The fluorine-containing polymer may be a branched fluorine-containing polymer component formed from a multifunctional branched fluorine-containing polyol precursor. The aqueous precursor also includes a fluorine-free precursor that forms a fluorine-free component including those described above, a crosslinking agent comprising a moiety selected from the group consisting of an amine moiety, a hydroxyl moiety, an isocyanate moiety, and a combination thereof including those described above, and water like those described above. In certain variations, an emulsifier is present like those described above. Further, other solvents, such as aqueous or polar solvents and non-aqueous or non-polar solvents may be included in the precursor liquid. The liquid precursor may also include at least one further agent selected from the group consisting of a catalyst, an anti-oxidant, a hindered amine stabilizer, a particulate filler, a pigment, a dye, a plasticizer, a flame retardant, a flattening agent, an adhesion promotor, and a combination thereof, such as any of those described above. The applying of the precursor liquid to the surface may be any coating technique, including but not limited to, spraying, brushing, dip coating, doctor-blade coating, spin coating, casting, printing, and the like. In one aspect, the precursor liquid may be applied by spraying onto the target regions of the surface.

In certain aspects, the method may also include preparing the aqueous precursor by mixing a water-borne fluorine-containing polyol precursor with the fluorine-free precursor, water, the crosslinking agent, and an optional catalyst. In another variation, preparing the aqueous precursor may include emulsifying a solvent-borne fluorine-containing polyol precursor with water and an emulsifier component to form the aqueous precursor comprising the fluorine-containing polyol precursor and mixing the aqueous precursor with the fluorine-free precursor, water, the crosslinking agent, and an optional catalyst. The solvent-borne precursor may be mixed with one or more surfactants and stirred rapidly while adding water dropwise until the amount of solvent is less than or equal to about 10% by weight. The solution may be continuously stirred with or without a gentle heating (e.g., around 30° C.) until a dispersion is formed.

In yet another variation, preparing the water-borne or aqueous precursor may include reacting the fluorine-containing polyol precursor, where the fluorine-containing polyol precursor is solvent-borne, with a hydrophilic moiety, an ionic moiety, or a combination thereof to form a fluoropolymer and mixing the fluoropolymer, with the fluorine-free precursor, water, the crosslinking agent, and an optional catalyst. Some examples of the hydrophilic or ionic moieties include 2,2-bis(hydroxymethyl)propionic acid (DMPA), triethylene glycol, and polyethylene glycol, that may be reacted with the solvent-borne fluorine-containing precursor.

The method also further includes (b) solidifying the precursor liquid to form an anti-fouling heterophasic thermoplastic polymeric coating on the surface of the article. The solidifying may include heating the precursor material and/or applying energy, such as actinic radiation (e.g., ultraviolet radiation) or electron beam to facilitate a crosslinking reaction of the precursors and removal of the water and/or solvent(s). In certain variations, the water and/or solvent(s) may be evaporated or volatilized from the applied precursor material and then the material may be heated, for example in an oven, to form the solid polymer. In certain variations, the methods may be environmentally friendly and may be substantially free of volatile organic compounds (VOC) or may significantly reduce VOC emissions. In one variation, no VOCs may be emitted during the coating process. In another variation, a low VOC process may have a VOC content of less than or equal to about 380 g/L, optionally less than or equal to about 250 g/L and in certain variations, optionally less than or equal to about 50 g/L.

The anti-fouling self-cleaning heterophasic thermoplastic polymeric coating thus formed includes a continuous phase including the fluorine-containing polymer component, which may be a branched fluorine-containing polymer, and a discrete phase defining a plurality of domains comprising a fluorine-free polymer, including all of those examples previously described above. The fluorine-free component is substantially immiscible with the fluorine-containing polymer. Each domain of the plurality of domains has an average size of greater than or equal to about 100 nm to less than or equal to about 5,000 nm within the continuous phase. At least a portion of the fluorine-containing polymer component in the continuous phase and at least a portion of the fluorine-free component in the discrete phase are bonded together with a moiety selected from the group consisting of a nitrogen-containing moiety, an oxygen-containing moiety, an isocyanate-containing moiety, and a combination thereof.

In certain variations, the heterophasic thermoset polymeric coating having an average light absorbency of greater than or equal to about 5% to less than or equal to about 100% per 0.01 cm thickness of the polymeric coating over a wavelength range of about 400 nm to about 800 nm, optionally greater than or equal to about 5% to less than or equal to about 35% per 0.01 cm thickness of the polymeric coating. In certain aspects, the heterophasic thermoset polymeric coating has an average light absorbency of greater than or equal to about 5% to less than or equal to about 100%, optionally greater than or equal to about 5% to less than or equal to about 35%, where the coating has a thickness of greater than or equal to about 50 µm to less than or equal to about 500 µm. In certain aspects, the branched fluorine-containing polymer component may be a highly crosslinked network having a relatively high crosslink density rendering it insoluble. Such a heterophasic thermosetting anti-fouling polymeric coating has not only an improved durability, but an enhanced ability to repel foreign matter from the coated surface. As described further below, the discrete phase size and distribution in the continuous phase can be confirmed by imaging with FTIR and confocal analysis.

In certain variations, prior to applying the precursor liquid to the surface to be treated, an adhesion layer may be applied to the surface or an adhesion-promoting agent may be added to the liquid precursor to form an adhesion-promoting layer. Examples of suitable adhesion promotors include, but are not limited to, alkoxysilanes that create chemical groups on a surface that bond to polyols such as (3-Glycidyl oxypropyl)trimethoxysilane (GPTMS), (3-Aminopropyl) triethoxysilane (APS), (3-Aminopropyl) triethoxysilane (APS) with (3,3,3-Trifluoropropyl) trimethoxysilane (FPTS), or (3-Aminopropyl) triethoxysilane (APS) with Trimethoxyphenylsilane (TMPS), and a combination thereof.

Various embodiments of the inventive technology can be further understood by the specific examples contained herein. Specific non-limiting Examples are provided for illustrative purposes of how to make and use the compositions, devices, and methods according to the present teachings.

Comparative Example 1

Comparative Example 1 is a water-borne fluoropolymer having no immiscible non-fluorinated polymer. A container is charged with about 10 g of water-borne a polyvinylidene fluoride copolymer (ZEFFLE™ S-7560 provided by Daikin) and about 10 g of additional water is added. To the resin solution, about 0.18 g of polyisocyanate crosslinker (BAYHYDUR™ XP2547 sold by Covestro) and 200 ppm of dibutyltin dilaurate catalyst is added. After the catalyst is added, the liquid precursor having the resin is mixed thoroughly. The solution is then sprayed onto the substrate of choice. After the water/carrier is allowed to evaporate, the coated substrate is placed in an oven set to 60° C. for 4 hours.

Comparative Example 2

Comparative Example 2 is a water-borne fluoropolymer having no immiscible non-fluorinated polymer. A container is charged with about 7.5 g of water-borne fluorinated acrylate copolymer (EVOPROTECT™ ESA sold by DyStar) and about 142.5 g of additional water is added. The liquid precursor having the resin is thoroughly mixed. The solution is then dip coated onto the substrate of choice. After the water/carrier is allowed to evaporate, the coated substrate is placed in an oven set to 120° C. for 10 minutes followed by 160° C. for 5 minutes.

Example 1

Example 1 is a heterophasic polymeric coating prepared in accordance with certain aspects of the present disclosure having a branched fluorine-containing polymer and a fluorine-free polymer (polypropylene glycol (PPG)). A container is charged with about 2 g of water-borne polyvinylidene fluoride copolymer (ZEFFLE™ S-7560), about 0.72 g of polypropylene glycol (PPG, MW 425) and an additional 20.77 g of water. To the resin solution, about 0.7 g polyisocyanate crosslinker (BAYHYDUR™ XP2547) and about 200 ppm of dibutyltin dilaurate catalyst is added. After the catalyst is added, the liquid precursor having the resin is thoroughly mixed. The solution is then sprayed onto the substrate of choice. After the water/carrier is allowed to evaporate, the coated substrate is placed in an oven set to 60° C. for 4 hours.

Example 2

Example 2 is a heterophasic polymeric coating prepared in accordance with certain aspects of the present disclosure having a branched fluorine-containing polymer and a fluorine-free polymer (a PLURONIC™ based polyalkylene glycol block copolymer). A container is charged with about 4 g of water-borne polyvinylidene fluoride copolymer (ZEFFLE™ S-7560), about 1.55 g of a triblock copolymer comprising poly(ethylene glycol)/poly(ethylene oxide) (PEG/PEO) and poly(propylene oxide) (PPO/PPG) (commercially available as PLURONIC™ P123, 70% PPG), and 31.53 g of additional water. To the resin solution, about 0.18 g of polyisocyanate crosslinker (BAYHYDUR™ XP2547) and about 200 ppm of dibutyltin dilaurate catalyst is added. After the catalyst is added, the liquid precursor having the resin is thoroughly mixed. The solution is then sprayed onto the substrate of choice. After the water/carrier is allowed to evaporate, the coated substrate is placed in an oven set to 60° C. for 4 hours.

Example 3

Example 3 is a heterophasic polymeric coating prepared in accordance with certain aspects of the present disclosure having a branched fluorine-containing polymer and a fluorine-free polymer (poly(ethylene glycol) (PEG) at about 10% by weight). A container is charged with about 4 g of polyvinylidene fluoride copolymer (ZEFFLE™ S-7560), about 0.32 g of polyethylene glycol (MW 200 g/mol) and 25.18 g of additional water. To the resin solution, about 0.7 g of polyisocyanate crosslinker (BAYHYDUR™ XP2547) and about 200 ppm of dibutyltin dilaurate catalyst is added. After the catalyst is added, the liquid precursor having the resin is thoroughly mixed. The solution is then sprayed onto the substrate of choice. After the water/carrier is allowed to evaporate, the coated substrate is placed in an oven set to 60° C. for 4 hours.

Example 4

Example 4 is a heterophasic polymeric coating prepared in accordance with certain aspects of the present disclosure having a branched fluorine-containing polymer and a fluorine-free polymer (polyethylene glycol (PEG) at about 30% by weight). A container is charged with about 7 g of water-borne polyvinylidene fluoride copolymer (ZEFFLE™ S-7560), about 2.38 g of polyethylene glycol (MW 600 g/mol) and 3.98 g of additional water. To the resin solution, about 1.61 g of polyisocyanate crosslinker (BAYHYDUR™ XP2547) and about 200 ppm of dibutyltin dilaurate catalyst is added. After the catalyst is added, the liquid precursor having the resin is thoroughly mixed. The solution is then sprayed onto the substrate of choice. After the water/carrier is allowed to evaporate, the coated substrate is placed in an oven set to 60° C. for 4 hours.

Example 5

Example 5 is a heterophasic polymeric coating prepared in accordance with certain aspects of the present disclosure having a branched fluorine-containing polymer and a fluorine-free component (charge). More specifically, DMPA is included as a monomer having a carboxylic acid group that becomes part of the crosslinked polymer. In this example, DMPA is a fluorine-free material in the polymer. A container is charged with about 5 g of water-borne polyvinylidene fluoride copolymer (ZEFFLE™ S-7560), about 0.21 g of dimethylolpropionic acid (DMPA) and about 28.17 g of additional water. To the resin solution, about 0.7 g of polyisocyanate crosslinker (BAYHYDUR™ XP2547) and about 200 ppm of dibutyltin dilaurate catalyst is added. After the catalyst is added, the liquid precursor having the resin is thoroughly mixed. The solution is then sprayed onto the substrate of choice. After the water/carrier is allowed to evaporate, the coated substrate is placed in an oven set to 60° C. for 4 hours.

Example 6

Example 6 is a heterophasic polymeric coating prepared in accordance with certain aspects of the present disclosure having a branched fluorine-containing polymer and a fluorine-free component (charge and a PLURONIC™ triblock poly(ethylene oxide) (PEO) and poly(propylene oxide) (PPO) polymer at about 10% by weight). A container is charged with about 7.5 g of water-borne fluorinated acrylate copolymer (EvoProtect™ ESA) and about 140 g of additional water. To the resin solution, about 0.65 g of blocked polyisocyanate crosslinker (BAYHYDUR™ BL2867), about 0.40 g of a triblock copolymer comprising poly (ethylene glycol)/poly(ethylene oxide) and poly(propylene oxide) (PPO) commercially available as PLURONIC™ P123 (70% PPG) and about 0.04 g DMPA is added. The liquid precursor having the resin is thoroughly mixed. The solution is then dipped onto the substrate of choice. After the water/carrier is allowed to evaporate, the coated substrate is placed in an oven set to 120° C. for 10 minutes followed by 160° C. for 5 minutes.

Figure 2:
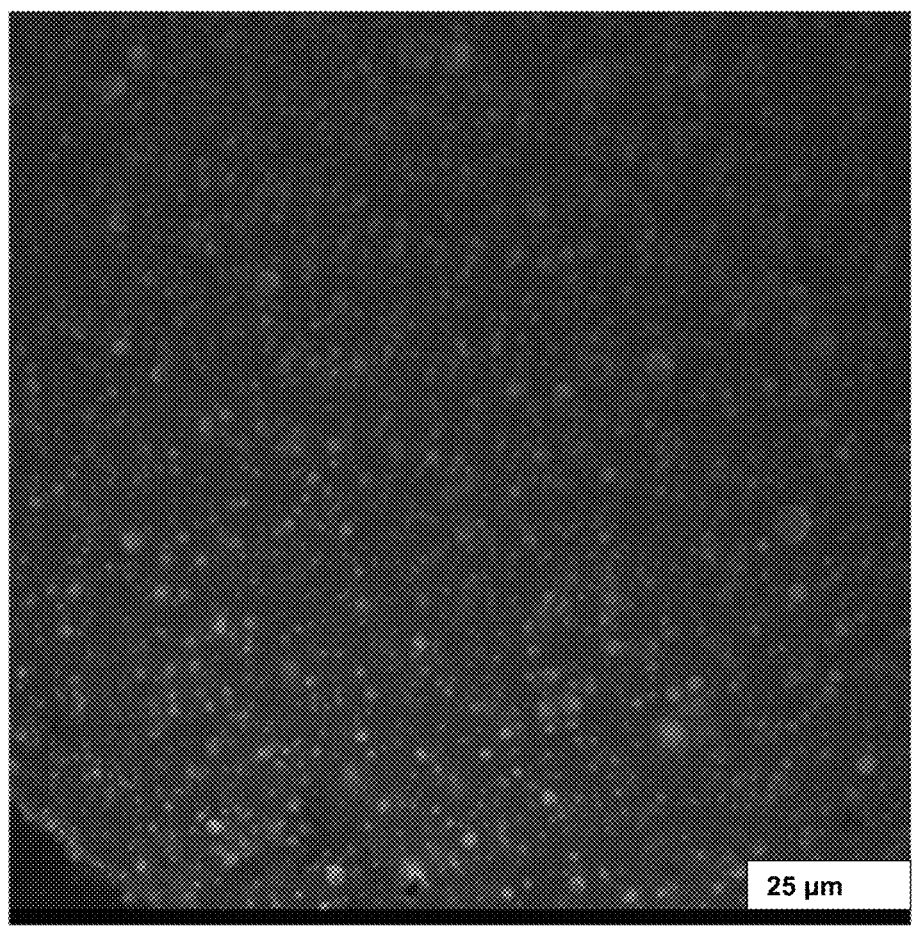
FIG. 2 is a laser scanning confocal microscope image of a free standing heterophasic thermoset polymeric coating prepared according to certain aspects of the present disclosure showing phase distribution.

FIG. 2 shows phase separation within a heterophasic polymeric coating prepared in accordance with Example 4 having a branched fluorine-containing polymer and a fluorine-free polymer (polyethylene glycol (PEG) at about 30% by weight). FIG. 2 shows a magnification level with a 25 µm scale bar. A freestanding film sprayed with the liquid precursor in Example 4 is soaked with a fluorescent dye that preferentially absorbs into polyethylene glycol areas. The film is then imaged using Laser scanning confocal microscope. The sample is excited with an Argon laser, emitting fluorescence at 512 nm. The lighter or more fluorescent green areas represent areas rich in polyethylene glycol. These discrete domains have sizes within the range of 500-5,000 nm. This confirms discrete areas of the fluorine-free secondary chemistry phase separated from the high fluorine rich areas in the continuous phase.

Stain Testing of Cloth

Stain testing and cleaning is performed on foam backed polyester cloth samples. A specified amount of soil is applied to the surface, and using a glass stir rod, the soil is rubbed into the fabric. After application, the soil must remain on the fabric for 30 minutes, before using the prescribed cleaners for each soil shown in order of application in Table 1. The stain is blotted with a dry cloth between each cleaner. After the final cleaning solution is used, the fabric is left for 24 hours to dry at room temperature and the optical difference, or ΔE, is measured between stained and unstained fabrics.

TABLE 1

| Soil | Amount | Time | Cleaner |
| --- | --- | --- | --- |
| Ketchup | 1 mL | 30 min wait, 20 min to clean | Water, 5% ammonia |
| Blue Pen | 5 mm diameter | | Water, 70% IPA, Naphtha |
| Oil | 3 to 4 drops | | Water, Naphtha, 0.5% soap, 5% ammonia, 2% acetic acid |

Fabrics coated with the water-borne formulations described above (Comparative Example 1-2 and Examples 1-6) are stain tested and compared to both an untreated fabric and a piece of fabric coated with a commercial stain repellent.

Stain test results of coatings compared to untreated fabric are represented in Table 2. The percentage represents a difference in delta E versus the untreated fabric. Greater positive differences indicate a less stained surface. The proprietary material is a C6 fluorocarbon coating.

The asterisks are used to distinguish a different fabric tested than the ones used for Comparative Example 1 and Examples 1-5, A=S-7560 fluorinated precursor and B=EvoProtect™ ESA fluorinated precursor. Table 2 summarizes how each formulation performed against the various stains. The addition of PPG, P123, and 10% PEG second chemistries outperformed the untreated control in all three stain categories, and notably performed better than the commercial stain repellant on pen.

TABLE 2

| Example | Coating | Ketchup | Pen | Oil |
| --- | --- | --- | --- | --- |
| Control | Untreated fabric | 0% | 0% | 0% |
| | Commercial Coat 1 | 72% | −92% | 57% |
| Comparative Example 1 | WB Fluoropolymer A only | −26% | 52% | 73% |
| 1 | WB Fluoropolymer A + PPG | 32% | 56% | 89% |
| 2 | WB Fluoropolymer A + PLURONIC ® | 57% | 79% | 34% |
| 3 | WB Fluoropolymer A + 10% PEG | 1% | 43% | 0% |
| 5 | WB Fluoropolymer A + Charge | 40% | −10% | 64% |
| * | Commercial Coat 2 | 45% | −18% | 6% |
| Comparative* Example 2 | WB Fluoropolymer B only | 50% | 51% | 48% |
| 6* | WB Fluoropolymer B + PLURONIC ® + Charge | 56% | 79% | 71% |

Figure 3:
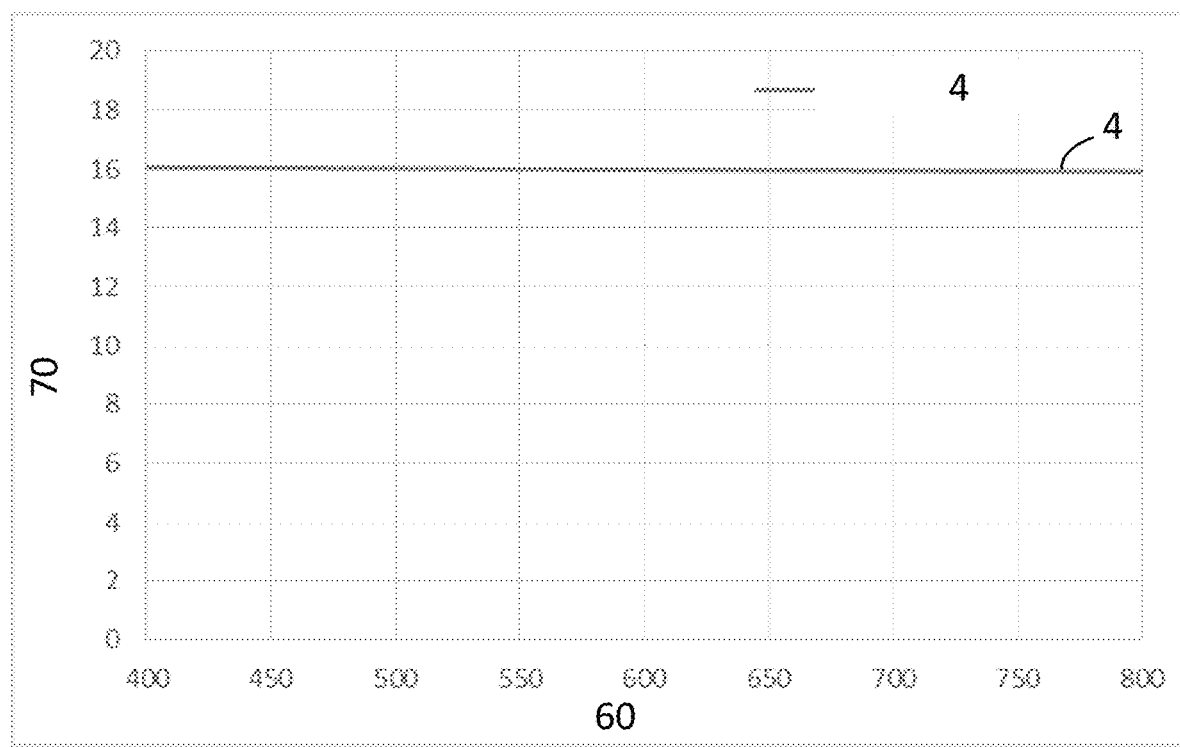
FIG. 3 is a graph of UV and visible absorbance measurements for a heterophasic thermoset polymeric coating prepared according to certain aspects of the present disclosure.

FIG. 3 shows UV and visible absorbance measurements of Example 4 (a branched fluorine-containing polymer and a fluorine-free polymer (polyethylene glycol (PEG) at about 30% by weight) designated "4." FIG. 3 displays the reduced transmittance of light through the respective coatings. The x-axis designated 60 is wavelength in nm, while the y-axis designated 70 shows absorbance (% absorbance/0.01 cm). A relatively large amount of polyethylene glycol (30% in Example 4) increases the concentration and size of the discrete domains disrupting the passage of light. Absorbance is about 16%. Stated in another way, the heterophasic inhomogeneous coatings of the present disclosure would not be clear or transparent. In contrast, conventional homogenous single, phase coatings are transparent.

Phase inhomogeneity typically causes opaque coatings or films due to the scattering of light. Scattering of light, including visible wavelengths in the bulk of a material, is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-800 nm, a clear or transparent coating generally keeps variations in index of refraction below about 50 nm in length. As phase inhomogeneities increase in length scale, the opacity of the material rises. Phase inhomogeneities with average length scales of at least 0.1 μm are expected to drive significant scattering in the material, leading to less-transparent structures above 25 μm in thickness—unless the multiple phases are refractive index-matched. See Althues et al., "Functional Inorganic Nanofillers for Transparent Polymers," Chem. Soc. Rev., 2007, 36, 1454-1465, the relevant portions of which are hereby incorporated by reference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heterophasic thermoset polymeric coating comprising:
   a continuous phase comprising a fluorine-containing polymer component formed from at least one fluorine-containing polyol precursor having a functionality of greater than 2; and
   a discrete phase defining a plurality of domains comprising a fluorine-free component formed from a fluorine-free precursor, wherein the fluorine-free component is substantially immiscible with the fluorine-containing polymer component, each domain of the plurality of domains has an average size of greater than or equal to about 100 nm to less than or equal to about 5,000 nm within the continuous phase, and at least a portion of the fluorine-free component in the discrete phase is bonded together with a moiety selected from the group consisting of a nitrogen-containing moiety, an oxygen-containing moiety, an isocyanate-containing moiety, and a combination thereof, wherein the heterophasic thermoset polymeric coating is formed from an aqueous precursor comprising water, the fluorine-containing polyol precursor, and the fluorine-free precursor.

2. The heterophasic thermoset polymeric coating of claim 1, wherein the fluorine-containing polyol precursor comprises a polyol fluoroacrylate or a polyol copolymer of polyvinylidene difluoride.

3. The heterophasic thermoset polymeric coating of claim 1, wherein the heterophasic thermoset polymeric coating has an average light absorbency of about 5% to about 35% over a wavelength range of about 400 nm to about 800 nm.

4. The heterophasic thermoset polymer coating of claim 1, wherein the fluorine-containing polymer component has an average molecular weight of greater than or equal to 10,000 g/mol to less than or equal to about 50,000 g/mol and the fluorine-free component has an average molecular weight of about 100 g/mol to about 15,000 g/mol.

5. The heterophasic thermoset polymer coating of claim 1, wherein:
   (i) the fluorine-containing polymer component comprises a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof; and
   (ii) the fluorine-free component is selected from the group consisting of a hygroscopic polymer, a hydrophobic polymer that is not lipophobic, an ionic hydrophilic precursor, an amphiphilic polymer, and a combination thereof, wherein:
      (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
      (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
      (c) the ionic hydrophilic precursor comprising a pendant carboxylate group, an amine group, a sulfate group, a phosphate group, and a combination thereof; and
      (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof.

6. The heterophasic thermoset polymer coating of claim 1, wherein the fluorine-containing polyol precursor is a branched fluorine-containing polyol precursor that forms a branched fluorine-containing polymer component.

7. The heterophasic thermoset polymer coating of claim 1, wherein the fluorine-containing polyol precursor comprises a polyol fluoroacrylate or a polyol copolymer of polyvinylidene difluoride.

8. The heterophasic thermoset polymer coating of claim 1, wherein the fluorine-free component is present in the coating in an amount of greater than or equal to about 5% to less than or equal to about 90% by weight of the total heterophasic thermoset polymer coating.

9. The heterophasic thermoset polymer coating of claim 1, further comprising a third polymer as a block.

10. A heterophasic thermoset polymeric coating comprising:
   a continuous phase comprising a fluorine-containing polymer component formed from at least one fluorine-containing polyol precursor having a functionality of greater than 2 and having an average molecular weight of greater than or equal to 2,000 g/mol to less than or equal to about 50,000 g/mol; and
   a discrete phase defining a plurality of domains comprising a fluorine-free component formed from a fluorine-free precursor, wherein the fluorine-free component is substantially immiscible with the fluorine-containing polymer component, each domain of the plurality of domains has an average size of greater than or equal to about 100 nm to less than or equal to about 5,000 nm within the continuous phase, the fluorine-free component having an average molecular weight of about 100 g/mol to about 15,000 g/mol, and at least a portion of the fluorine-free component in the discrete phase is bonded together with a moiety selected from the group consisting of a nitrogen-containing moiety, an oxygen-containing moiety, an isocyanate-containing moiety, and a combination thereof, wherein the heterophasic thermoset polymeric coating is formed from an aqueous precursor comprising water, the fluorine-containing polyol precursor, and the fluorine-free precursor.

11. The heterophasic thermoset polymeric coating of claim 10, wherein the fluorine-containing polyol precursor comprises a polyol fluoroacrylate or a polyol copolymer of polyvinylidene difluoride.

12. The heterophasic thermoset polymeric coating of claim 10, wherein the heterophasic thermoset polymeric coating has an average light absorbency of about 5% to about 35% over a wavelength range of about 400 nm to about 800 nm.

13. The heterophasic thermoset polymer coating of claim 10, wherein the fluorine-free component has an average molecular weight of about 100 g/mol to about 4,000 g/mol.

14. The heterophasic thermoset polymer coating of claim 10, wherein:
   (i) the fluorine-containing polymer component comprises a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof; and
   (ii) the fluorine-free component is selected from the group consisting of a hygroscopic polymer, a hydrophobic polymer that is not lipophobic, an ionic hydrophilic precursor, an amphiphilic polymer, and a combination thereof, wherein:
      (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;

(b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;

(c) the ionic hydrophilic precursor comprising a pendant carboxylate group, an amine group, a sulfate group, a phosphate group, and a combination thereof; and (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof.

15. The heterophasic thermoset polymer coating of claim 10, wherein the fluorine-containing polyol precursor is a branched fluorine-containing polyol precursor that forms a branched fluorine-containing polymer component.

16. The heterophasic thermoset polymer coating of claim 10, wherein the fluorine-containing polyol precursor comprises a polyol fluoroacrylate or a polyol copolymer of polyvinylidene difluoride.

17. The heterophasic thermoset polymer coating of claim 10, wherein the fluorine-free component is present in the coating in an amount of greater than or equal to about 5% to less than or equal to about 90% by weight of the total heterophasic thermoset polymer coating.

18. The heterophasic thermoset polymer coating of claim 10, further comprising a third polymer as a block.

\* \* \* \* \*